(12) United States Patent
Pugalia et al.

(10) Patent No.: US 10,032,094 B2
(45) Date of Patent: Jul. 24, 2018

(54) DATA CARD GUIDE TO IMPROVE USER EXPERIENCE

(71) Applicant: Honeywell International Inc., Morristown, NJ (US)

(72) Inventors: Alok Kumar Pugalia, Hyderbad (IN); Wayne Fisher, Feasterville, PA (US); Piyush Gangwal, Shrirampur (IN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 14/571,529

(22) Filed: Dec. 16, 2014

(65) Prior Publication Data

US 2016/0171347 A1    Jun. 16, 2016

(51) Int. Cl.
| G06K 19/00 | (2006.01) |
| G06K 13/063 | (2006.01) |
| G06K 13/08 | (2006.01) |
| G06K 7/00 | (2006.01) |

(52) U.S. Cl.
CPC .......... G06K 13/063 (2013.01); G06K 13/08 (2013.01); G06K 7/0056 (2013.01)

(58) Field of Classification Search
USPC ................................................ 235/483–485
See application file for complete search history.

(56) References Cited

U.S. PATENT DOCUMENTS

| 5,128,524 A | 7/1992 | Anglin et al. |
| 5,173,597 A | 12/1992 | Anglin |
| 5,180,905 A | 1/1993 | Chen et al. |
| 5,625,534 A | 4/1997 | Okaya et al. |
| 6,070,802 A * | 6/2000 | Yi .................. G06K 13/0893 235/475 |
| 7,713,091 B2 | 5/2010 | Chen |
| 7,837,487 B2 | 11/2010 | Zuo |
| 8,085,544 B2 | 12/2011 | Zhao |
| 8,747,162 B2 | 6/2014 | Sherry |
| 2004/0190386 A1 | 9/2004 | Nakakubo et al. |

(Continued)

FOREIGN PATENT DOCUMENTS

EP    1083518 B1    6/2006

OTHER PUBLICATIONS

PCT International Search Report for PCT/US2015/064401 dated Mar. 23, 2016.

*Primary Examiner* — Matthew Mikels
(74) *Attorney, Agent, or Firm* — Kermit D. Lopez; Luis M. Ortiz; Ortiz & Lopez, PLLC

(57) ABSTRACT

A data card guide apparatus includes a card guide having a guide base and in some embodiments, a finger slot or channel to ease card usage. The card guide can be aligned in a horizontal plane and a vertical plane with a card slot for receiving a data card irrespective of the height and the position of the card slot. In some embodiments, a channel can be formed from channel walls located above the card guide to allow for holding of the data card with two fingers while the data card slides in or out of the card guide. Such a channel can be configured as an extension of the card guide and the height of the channel is equivalent to the height of the guide base. With either configuration, a user does not need to look at the card slot to slide in or remove the data card.

13 Claims, 5 Drawing Sheets

(56) References Cited

U.S. PATENT DOCUMENTS

2007/0019845 A1* 1/2007 Kato .................. G06K 9/00013
382/126
2007/0293092 A1 12/2007 Seo
2008/0207060 A1 8/2008 Kiryu et al.

* cited by examiner

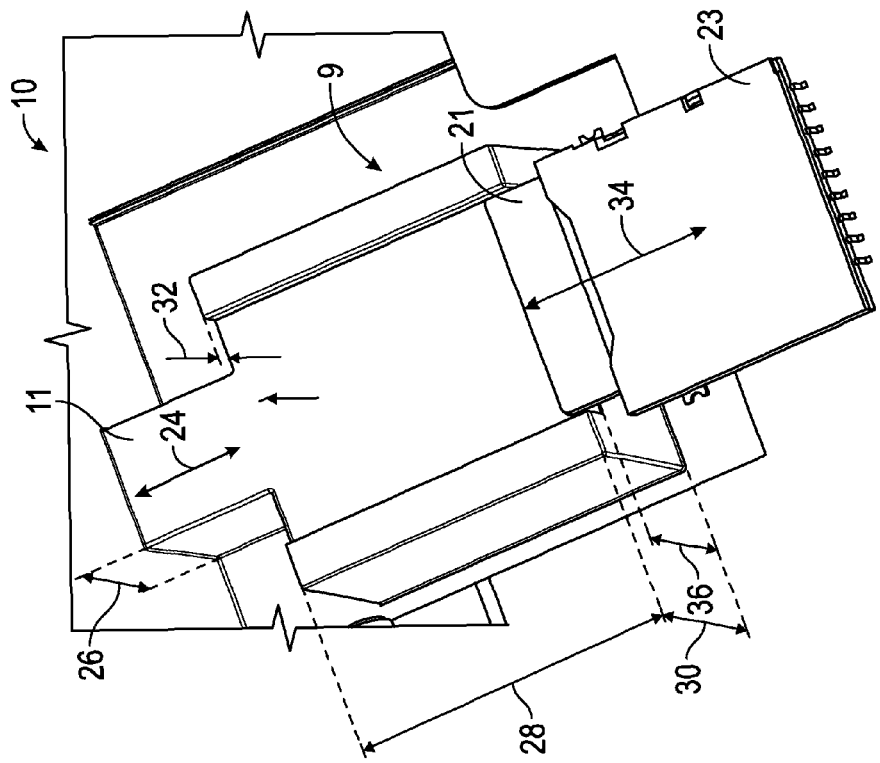
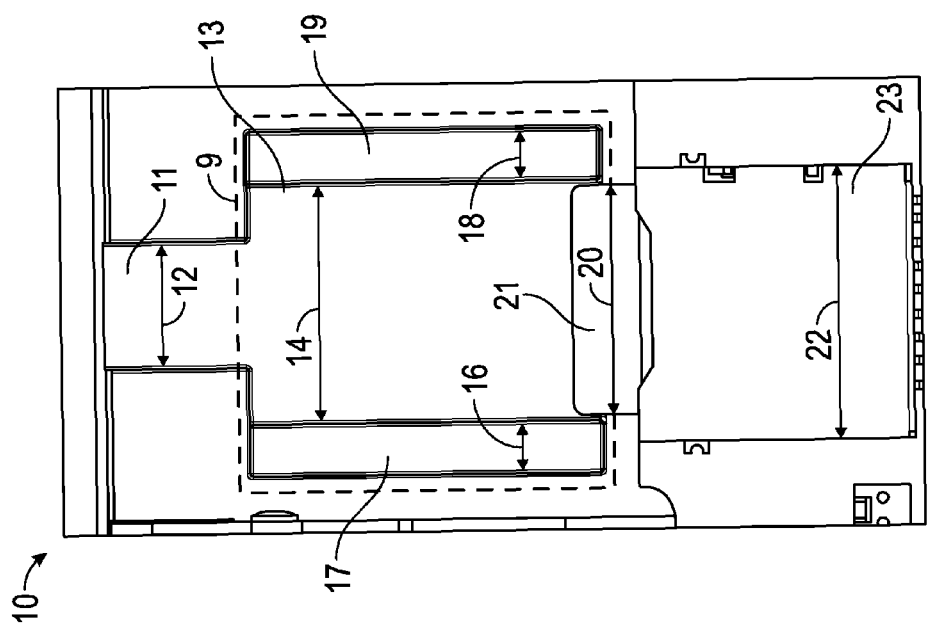

DATA CARD GUIDE TO IMPROVE USER EXPERIENCE

FIELD OF THE INVENTION

Embodiments are related to data cards that store and/or transfer data. Embodiments further relate to data card alignment devices and techniques.

BACKGROUND

The vast majority of electronic devices employ data cards in some capacity to store and/or transfer data in bulk. With technology advancements, data cards are becoming increasingly less expensive while improving in quality, and hence are becoming more popular. Most of the time, a user is expected to install the data card into a device by looking at the slot and positioning the gadget in a convenient position (e.g., in a digital camera or a laptop computer).

Unfortunately as such electronic devices and gadgets become smaller and thinner, the convenience to the user for card emplacement is increasingly compromised. To add to this problem, when the devices are of a fixed installation type (e.g., industrial recorders, cameras, meters, etc.), users may not have the luxury of obtaining a convenient position to insert the card and at times may not be able to look at the slot to position the card.

Another problem with the use of conventional card emplacement configurations is the lack of a desired comfort in holding the data cards from both sides for insertion or removing the devices from a slot because of their thin structure. At times when space is at a premium, even this is compromised and users are expected to slide in/out the card with single finger or thumb, which is difficult with the current card guides (e.g., such as used in mobile smartphones and so on).

SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved apparatus for guiding and aligning data cards in electronic devices.

It is another aspect of the disclosed embodiments to provide for a data card guide apparatus for inserting or removing a data card without a user having to look for the card slot and without having to position the electronic device to a convenient position for emplacement or removal of the data card.

It is yet another aspect of the disclosed embodiments to provide a data card guide apparatus that allows a user to comfortably hold a data card from both sides for emplacement or removal of the data card from an electronic device.

It still another aspect of the disclosed embodiments to provide a data card guide apparatus with an option to slide the data card with one finger.

The aforementioned aspects and other objectives and advantages can now be achieved as described herein. In an example embodiment, a data card guide apparatus can be implemented, which includes a card guide having a guide base. The card guide can be aligned in a horizontal plane and a vertical plane with a card slot for receiving a data card irrespective of the height and the position of the card slot. A channel formed from channel walls can be located above the card guide to allow for holding of the data card with two fingers while the data card slides in or out of the card guide. Such a channel can be configured as an extension of the card guide and the height of the channel is equivalent to the height of the guide base. With this configuration, a user does not need to look at the card slot to slide in or remove the data card.

BRIEF DESCRIPTION OF THE FIGURES

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

FIG. 1 illustrates a sectional view of a data card guide apparatus, which can be implemented in accordance with an alternative embodiment;

FIG. 2 illustrates a perspective view of the data card guide apparatus shown in FIG. 1, in accordance with an alternative embodiment;

DETAILED DESCRIPTION

Figure 3:
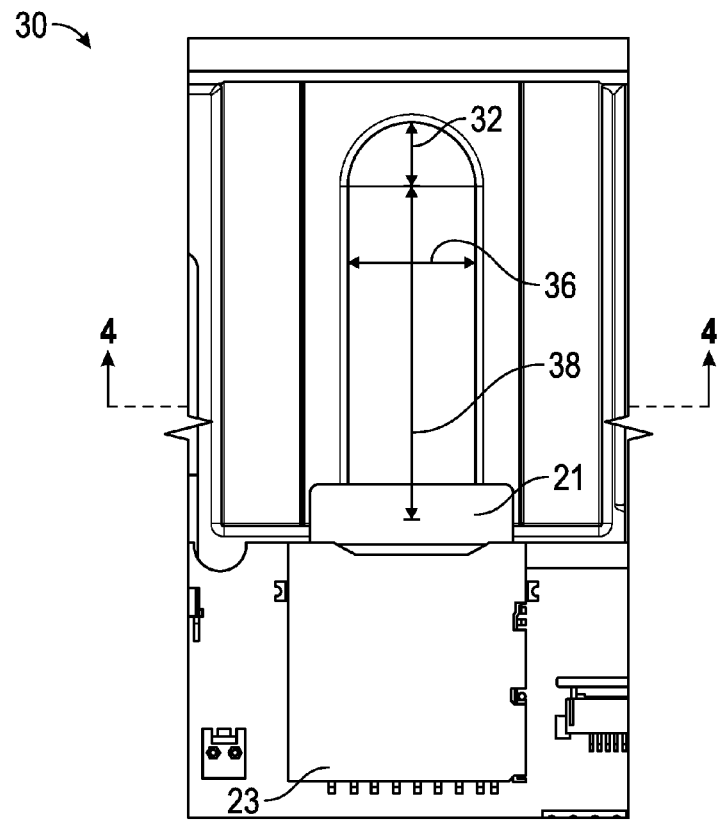
FIG. 3 illustrates a top view of a data card guide apparatus including a finger slot length extension $ROC_L$, in accordance with a preferred embodiment.

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the embodiments to those skilled in the art. Like numbers refer to like elements throughout. As used herein, the term "and/or" includes any and all combinations of one or more of the associated listed items.

FIG. 1 illustrates a sectional view of a data card guide apparatus 10, which can be implemented in accordance with an alternative embodiment. The data card guide apparatus 10 shown in FIG. 1 can be configured in the context of an electronic device or "gadget" such as digital camera, laptop computer, smartphone, pad computing device, and so forth. The data card guide apparatus 10 includes a channel 11 formed from channel walls and having a channel width 12. The data card guide apparatus 10 further includes a guide base 13 having a guide base width 14. The guide base 13 connects or forms with guide side walls 17 and 19, respectively having side wall widths 16 and 18 and which together form a card guide 9 that is generally indicated by the area surrounded by dashed lines in FIG. 1. A data card 23 can be received by a card slot 21. The data card 23 has a card width 22 and the card slot 21 has a card slot width 20.

FIG. 2 illustrates a perspective view of the data card guide apparatus 10 shown in FIG. 1, in accordance with an alternative embodiment. Note that in FIGS. 1-6, identical or similar parts or elements are generally indicated by identical reference numerals. As shown in FIG. 2, the data card guide apparatus 10 includes the channel 11 having a channel length 24 and a channel height 26. The guide length 28 and guide height 30 are also shown in the FIG. 2 depiction of data card guide apparatus 10, along with the guide side wall height 32 and the guide base height 36. The card length 34 is also illustrated in FIG. 2.

The configuration shown in FIG. 1-2 for data card guide apparatus 10 addresses the needs of inserting and/or removing data card 23 without having to look at where the card slot 21 is, and without having to position the gadget to a convenient location for emplacement or removal of the data card 23. This arrangement comfortably permit a user to hold the data card 23 from both sides and includes an option to slide the card 21 with one finger as an additional mechanism. In situations where space is at a premium and/or installation is a fixed type, the embodiment illustrated in FIGS. 1-2 (including FIGS. 3-6 herein) offers the unique advantage of reusing widely available card holders while enhancing the user experience for card access and/or removal.

Data card guide apparatus 10 thus includes the guide 9, which aligns the card slots in the horizontal and vertical plane, thereby allowing a user to simply slide the data card 23 in or out without actually having to look at the card slot 21. This configuration also includes a provision (e.g., channel or slot), wherein a user can hold the data card 23 from both sides while placing or removing the card 23.

FIGS. 1-2 illustrate an arrangement in which the guide 9 aligns with the card slot 21 in both the horizontal and vertical planes, irrespective of the height and position of the card slot 21. The channel 11 above the guide 9 or a finger slot therebelow allows the user to hold the data card 23 with both fingers while the data card 23 is slid in or out of the guide 9. The data card guide apparatus 10 thus provides a mechanism in which the user does not need to look at the card slot 21 to slide in or remove the data card 23.

Figure 4:
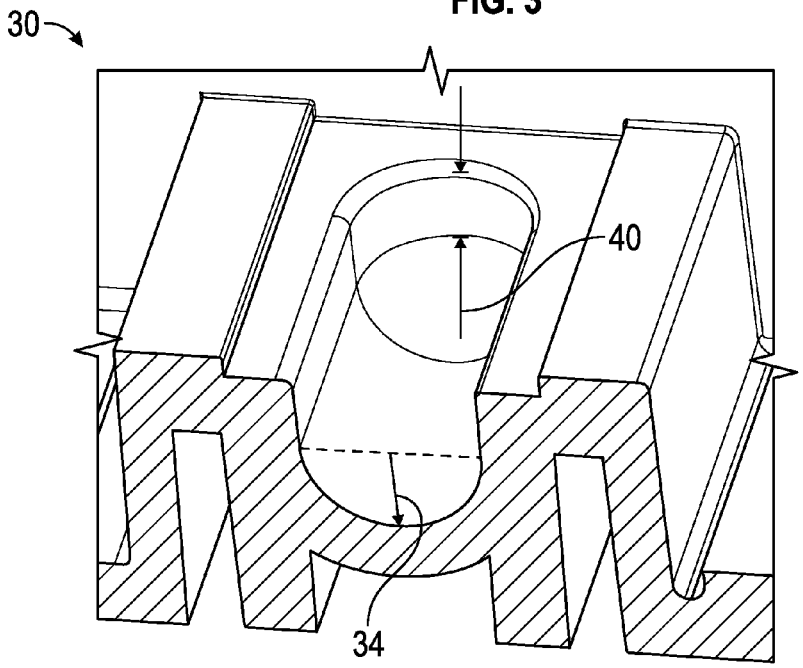
FIG. 4 illustrates a perspective view of the data card guide apparatus shown in FIG. 3, including a finger slot height extension $ROC_H$, in accordance with a preferred embodiment.
Figure 5:
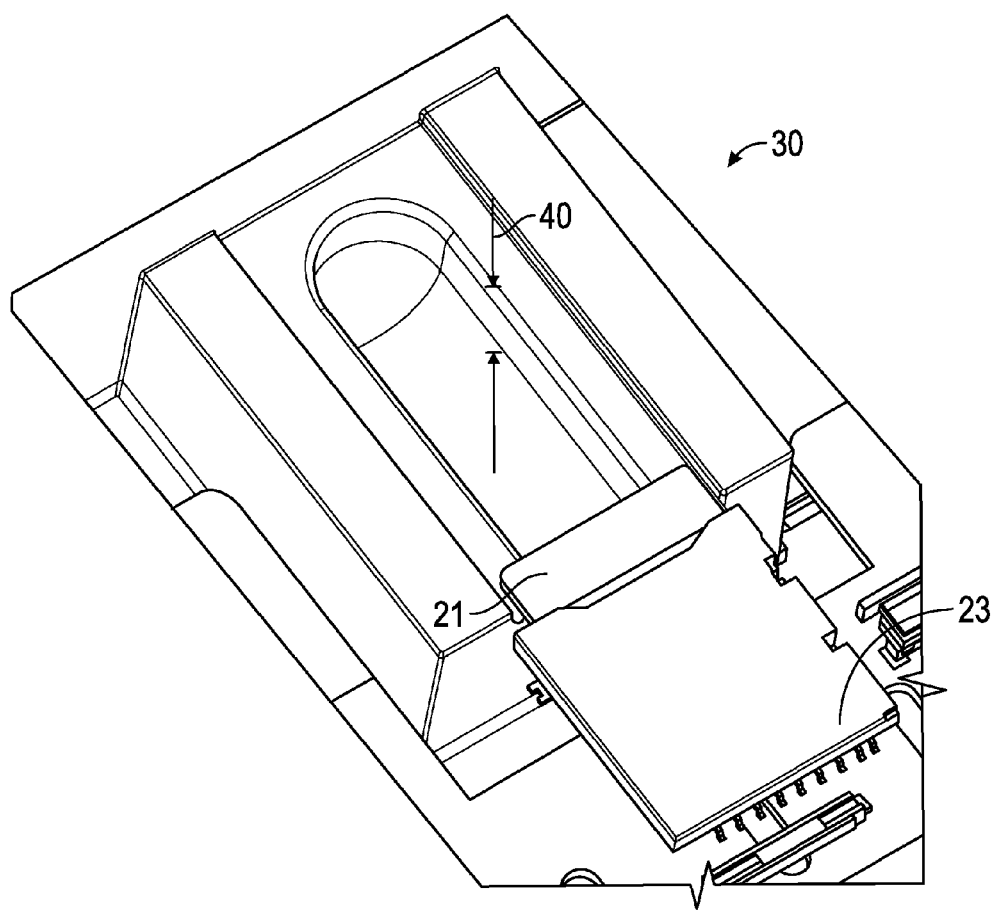
FIG. 5 illustrates a top perspective view of the data card guide apparatus shown in FIGS. 3-4, including a finger slot height, in accordance with a preferred embodiment.

FIGS. 3, 4, and 5 illustrate a data card guide apparatus 30, which can be implemented in accordance with a preferred embodiment. Note that the data card guide apparatus 30 shown in FIGS. 3, 4, and 5 is similar or analogous to the data card guide apparatus 10 depicted in FIGS. 1-2, with the addition of an ROC (Radius of Curvature) to improve the aesthetics and ergonomics of the slot at the end. Note that as the ROC may be designated respectively as $ROC_L$ (finger slot length extension) or $ROC_H$ (finger slot height extension). It is preferred that the total length (i.e., slot length & $ROC_L$) does not exceed the guide length. From an aesthetic and ergonomics point of view, however, it is preferred that the total length is kept the same as the $ROC_H$. A finger slot length extension $ROC_L$ 32 is shown in FIG. 3 along with a finger slot width 36 and a finger slot length 38. In FIG. 4, the finger slot height extension $ROC_H$ 34 is shown with respect to the finger slot height 40, which is also depicted in FIG. 5.

Note that conventional guides (e.g., such as those currently used in mobile phones) provide a way for a user to place the card and push it in with his or her thumb or finger. Pulling the card out, however, is not easy most of the time with such a conventional approach. Additionally, the user still must look at the slot and position the gadget to a convenient position before he or she can push in the card or remove it. The disclosed embodiments avoid these types of problems.

Figure 6:
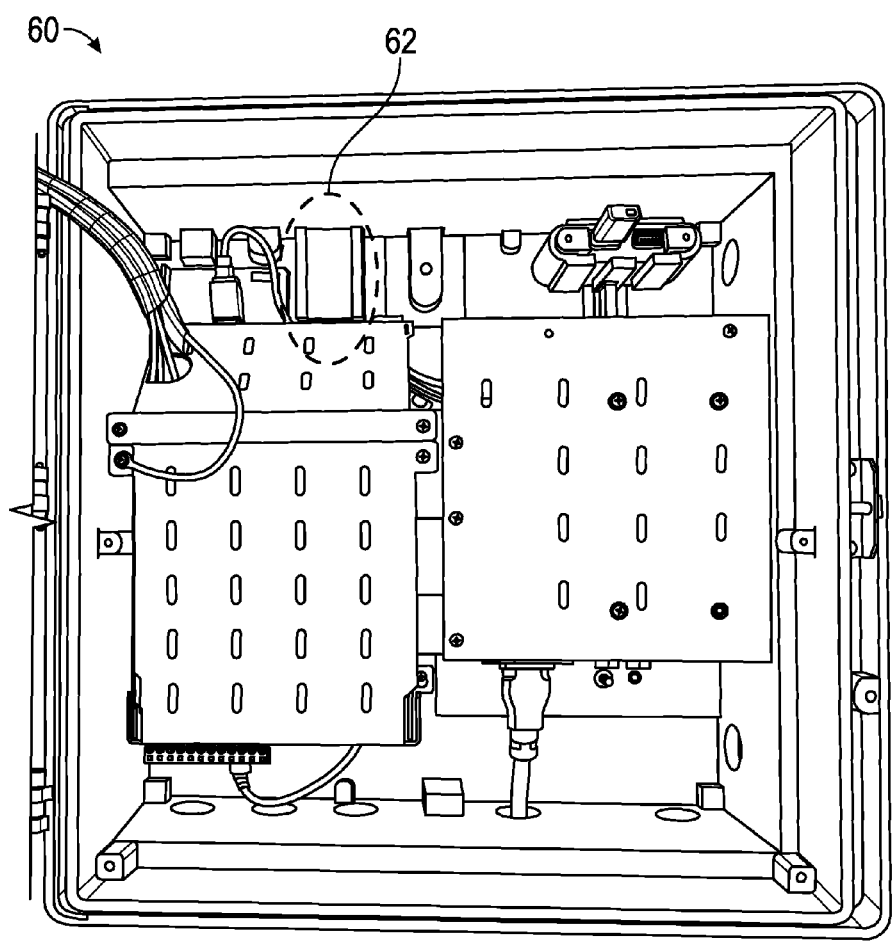
FIG. 6 illustrates an example embodiment of a data card (without a channel shown), in accordance with a usage scenario.

FIG. 6 illustrates an example embodiment 60 of a data card (without a channel shown), in accordance with a usage scenario. The area generally indicated by and within oval 62 in FIG. 6 shows a data card guide which is similar to the guide 9 shown in FIGS. 1-2.

Figure 7:
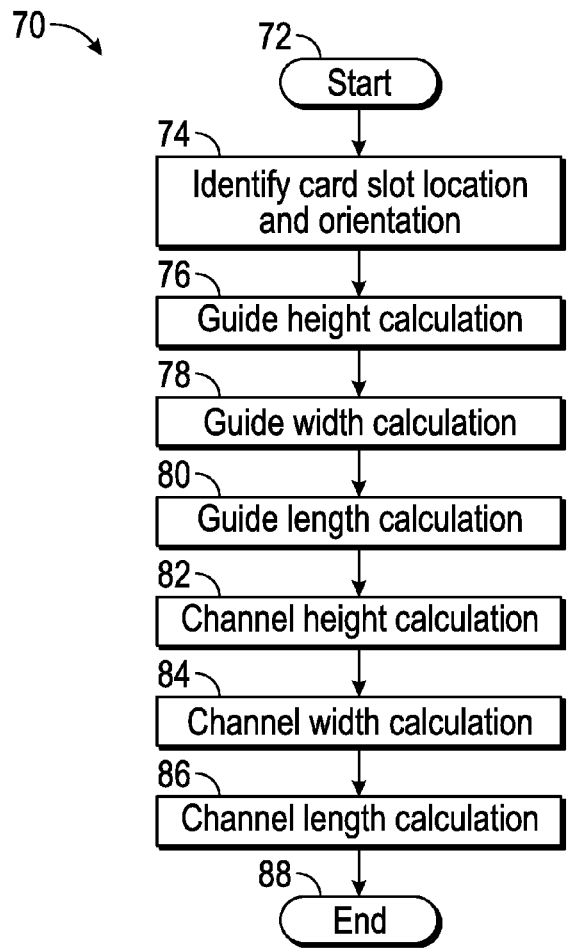
FIG. 7 illustrates a high level flow chart of operations depicting logical operational steps of a method for designing and configuring a data card guide apparatus such as those shown in FIGS. 1-6 herein, in accordance with a preferred embodiment.

FIG. 7 illustrates a high level flow chart of operations depicting logical operational steps of a method 70 for designing and configuring a data card guide apparatus such as those shown in FIGS. 1-6 herein, in accordance with a preferred embodiment. As shown at block 72, the process begins. Then, as depicted at block 74, a step or operation can be implemented to identifying a card slot location and orientation. The operation shown at block 74 can include calculating the slot height from the base on which the guide is to be designed. The guide can be oriented so as to face the card slot.

Next, as illustrated at block 76, a step or operation can be implemented to calculate the guide height. This step or operation can involve implementation of an arrangement in which the guide base height equals the slot height to provide an exact alignment in the vertical direction. Additionally, a tolerance stack up can be performed to estimate the variation in height mismatch. The operation shown at block 76 can further involve tightening the tolerances if the mismatch is more than 10% of the card thickness. If a mismatch cannot be brought down, then a slope can be added to the guide near the slot so that it does not overlap the slot. In some situations, the side wall height may be equivalent to the card thickness. That is, the tolerance should be such that it is more than the slot/card thickness. As part of the operation shown at block 76, the guide height is generally equal to the guide base height plus the side wall height.

Following processing of the step or operation shown at block 76, a step or operation for calculating the guide width can be implemented, as depicted at block 78. Calculation of the guide width can be based on the formulation that the width of the guide is equal to the guide base width plus two times the side walls (i.e., width of the guide=guide base width+2*side walls). The guide base width is also equal to the card width, wherein the tolerance should be such that it is more than the card width. Finally, the side wall width is approximately 10% to 25% of the guide base width depending on the material properties utilized to achieve a reasonable structural strength.

Following implementation of the step or operation shown at block 78, a step or operation for calculating the guide length can be implemented, as described at block 80. The length of the guide can be designed to a minimum of half the card length. This helps the card slide in and out even when the card is not in the slot. The maximum length may be limited by the exact placement of the guide. However, it is preferred to keep the maximum length less than the total card length in order to reduce the travel required by the card before it can slide in or out.

A step or operation for calculating the channel height can then be performed, as shown at block 82. In general, the channel is an extension of the guide. So the height should be exactly the same as the guide base. Thereafter, a channel width calculation step or operation can be performed, as shown at block 84. The width of the channel is preferably around 50% of the card width so as to provide support to the card while it is being held by fingers. Centering the channel on the guide is desirable to provide uniform user handling, however, it can be skewed depending on user preferences (left/right handed) and/or design constraints.

Thereafter, as indicated at block 86, a step or operation can be performed for calculating the channel length. The length of the channel should be larger of half the card length and the width of the fingers that are expected to hold the card. This ensures that the card has travelled out of the slot completely before being pulled out. This also ensures that the user has enough of a gap for placing his or her finger for holding the card. In case the guide itself has enough length to let the card travel out of the slot, this length can be decided solely based on the finger width. Following processing of the operation shown at block 86, the process can then terminate, as depicted at block 88. Alternatively, additional operational steps can be implemented such as those shown in FIG. 8 and described below.

Figure 8:
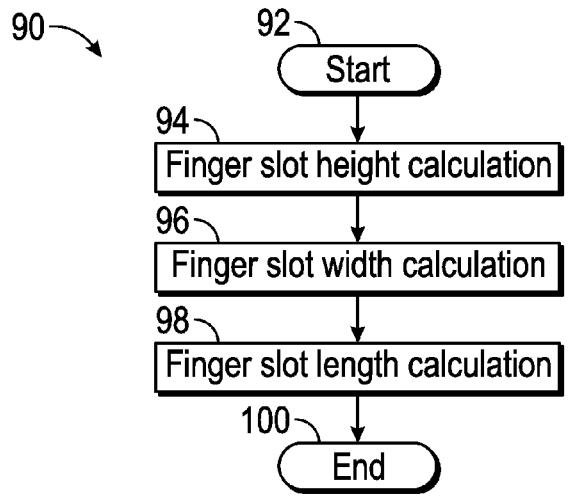
FIG. 8 illustrates a high level flow chart of operations depicting logical operational steps of a method for designing and configuring a data card guide apparatus with a finger slot design such as shown in FIGS. 3, 4, and 5, in accordance with an alternative embodiment.

FIG. 8 illustrates a high level flow chart of operations depicting logical operational steps of a method 90 for designing and configuring a data card guide apparatus with a finger slot design such shown in FIGS. 3, 4, and 5, in accordance with an alternative embodiment. As depicted at block 92, the process or method 90 can be initiated.

Then, as illustrated at block 94, a step or operation can be implemented to calculate the finger slot height. This finger slot mechanism can be configured inside the guide, which limits its maximum height to that of the guide. The preferred minimum height is such that the user is able to put a finger into the slot. In cases where this may not be possible, it is preferred to increase the width accordingly to allow for multiple fingers to be placed. Additionally the Radius of Curvature ($ROC_H$) as discussed earlier can be added to improve the aesthetics and ergonomics of the slot. There is no specific guideline to be followed here; that is, whatever suits the needs can be chosen as long as the total height (slot height+$ROC_H$) does not exceed the guide height.

As depicted next at block 96, a step or operation can be implemented to calculate the finger slot width. For the same reason as for the height, its width is limited to a maximum of the guide base width. The minimum width preferred is such that the user is able to put a finger into the slot. In some cases, it might be required to increase the width to compensate for the reduction in height in cases where the height is not as per the guideline above.

As shown thereafter at block 98, a step or operation can be implemented to calculate the finger slot. For the same reason as for the height and width, its length may be limited to a maximum of the guide length. It is preferred to start the finger slot right where the guide starts below the card. This way even if the card goes almost entirely into the card slot, it will be easy for a user to pull it out. The slot is preferred to have a minimum length, which is more than the card length. This enables the user to pull out the card even if it has to be completely slid out before removing. Such an arrangement, however, is flexible and depends on actual needs and preferences.

Additionally, as discussed earlier, a Radius of Curvature ($ROC_L$) can be added to improve the aesthetics and ergonomics of the slot at the end. There is no specific guideline to be followed here. That is, whatever suits design needs can be selected so as long as the total length (i.e., slot length+$ROC_L$) does not exceed the guide length; however, from an aesthetics and ergonomics point of view, it is preferred to keep the total length generally the same as the $ROC_H$.

Note that additional design steps may be implemented. For example, material finishing steps can include providing a smooth finish to the guide base and the channel to aid in the movement of the card as it is placed or removed from the card slot. Hence, the user experience can be improved. On the finger slot described earlier, a smooth finish ensures a silky touch experience for the user. In cases where a smooth finish is not possible or cannot be achieved during manufacturing, secondary operations can be implemented to achieve such a finish. Another option is to design textures that provide a desired finish. Additionally, drafts can be added to any surface as long as they aid in implementing design guidelines.

Based on the foregoing, it can be appreciate that a number of embodiments are disclosed, preferred and alternative. For example, in one embodiment, a data card guide apparatus can be implemented, which includes, for example, a card guide having a guide base, the card guide aligned in a horizontal plane and a vertical plane with a card slot for receiving a data card irrespective of a height and a position of the card slot; and a finger slot mechanism having a finger slot formed from finger slot walls having a radius curvature ($ROC_H$), the finger slot mechanism located below and within the card guide to assist in sliding the data card in or out of the card guide, the finger slot configured to allow a finger to fit into the slot.

In some example embodiments, the total height of the finger slot mechanism may be the height of the finger slot plus the radius of curvature ($ROC_H$) and does not exceed a height of the card guide. In still another example embodiment, the width of the finger slot can be limited to the maximum of the width of the guide base. In yet another example embodiment, the finger slot mechanism can be a minimum width that allows a finger to slide into the finger slot. In some example embodiments, the length of the finger slot mechanism may be limited to the maximum of a length of the card guide. In still other example embodiments, the finger slot may have a minimum length that is more than the length of the data card. In still other example embodiments, the finger slot further can further include a radius of curvature ($ROC_L$) at an end of the finger slot.

In some example embodiments, the data card guide apparatus can include a card guide having a guide base. The card guide can be aligned in a horizontal plane and a vertical plane with a card slot for receiving a data card irrespective of the height and position of the card slot, and a finger slot mechanism having a finger slot formed from finger slot walls having a radius curvature ($ROC_H$). The finger slot mechanism can be located below and within the card guide to assist in sliding the data card in or out of the card guide. The finger slot can be configured to allow a finger to fit into the slot. The finger slot further include a radius of curvature ($ROC_L$) at an end of the finger slot.

In another example embodiment, a data card guide apparatus can be implemented, which includes a card guide having a guide base, the card guide aligned in a horizontal plane and a vertical plane with a card slot for receiving a data card irrespective of a height and a position of the card slot, wherein the card guide is oriented to face the card slot and wherein a height of the guide base equals a height of the card slot to provide for an exact alignment in a vertical direction.

The card guide can include side walls wherein the height of the side walls is equal to the thickness of the data card. In some example embodiments, the width of the card guide is equal to the width of the guide base plus two times a width of the side walls. In another example embodiment, the width of the guide base is equal to the width of the card. In yet another example embodiment, the length of the card guide is half of the length of the data card to assist the data card in sliding in and out of the card slot even when the data card k not in the card slot. In still other example embodiments, the guide base can be configured with a smooth finish to aid in the movement of the data card in and out of the card slot.

In yet another example embodiment, a channel can be formed from channel walls and located above the card guide to allow for holding of the data card with at least two fingers while the data card slides in or out of the card guide, the channel configured as an extension of the card guide and wherein a height of the channel is equivalent to a height of the guide base. In some example embodiments, the width of the channel is approximately half the width of the data card to provide support to the data card while the data card is being held by fingers. In another example embodiment, the length of the channel is larger than half the length of the card. In other example embodiments, the channel walls can have a shape selected from among a variety of different types of shapes. In other words, the channel and/or the channel walls can be designed with different shapes. In some example embodiments, the channel walls can be configured with a single wall located to one side.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A data card guide apparatus, comprising:
   a card guide having a guide base, said card guide aligned in a horizontal plane and a vertical plane with a card slot for receiving a data card irrespective of a height and a position of said card slot, wherein said card guide is oriented to face said card slot and wherein a height of said guide base equals a height of said card slot to provide for an exact alignment in a vertical direction; and
   a channel formed from channel walls and located above said card guide to allow for holding of said data card with at least two fingers while said data card slides in or out of said card guide, said channel configured as an extension of said card guide and wherein a height of said channel is equivalent to a height of said guide base, wherein said channel walls comprise a single wall located on one side.

2. The apparatus of claim 1 wherein said guide base is configured with a smooth finish to aid in a movement of said data card in and out of said card slot.

3. A data card guide apparatus, comprising:
   a card guide having a guide base, said card guide aligned in a horizontal plane and a vertical plane with a card slot for receiving a data card irrespective of a height and a position of said card slot, wherein said card guide is oriented to face said card slot and wherein a height of said guide base equals a height of said card slot to provide for an exact alignment in a vertical direction; and
   a channel formed from channel walls and located above said card guide to allow for holding of said data card with at least two fingers while said data card slides in or out of said card guide, said channel configured as an extension of said card guide and wherein a height of said channel is equivalent to a height of said guide base and wherein said channel walls comprise a shape selected from among a variety of different types of shapes and wherein a width of said channel is approximately half a width of said data card to provide support to said data card while said data card is being held by fingers.

4. The apparatus of claim 3 wherein said card guide comprises side walls wherein a height of said side walls is equal to a thickness of said data card.

5. The apparatus of claim 3 wherein a width of said card guide is equal to a width of said guide base plus two times a width of said side walls.

6. The apparatus of claim 3 wherein a width of said guide base is equal to a width of said card.

7. The apparatus of claim 3 wherein a length of said card guide is half of a length of said data card to assist said data card in sliding in and out of said card slot even when said data card is not in said card slot.

8. The apparatus of claim 3 wherein said guide base is configured with a smooth finish to aid in a movement of said data card in and out of said card slot.

9. The apparatus of claim 3 wherein a length of said channel is larger than half a length of said card.

10. The apparatus of claim 3 wherein said channel walls comprise a single wall located on one side.

11. The apparatus of claim 1 wherein a length of said channel is larger than half a length of said card.

12. The apparatus of claim 1 wherein said channel walls comprise a shape selected from among a variety of different types of shapes.

13. The apparatus of claim 2 wherein a length of said channel is larger than half a length of said card.

* * * * *